United States Patent [19]
Justi

[11] 4,078,545
[45] Mar. 14, 1978

[54] LOW-LOSS SOLAR HEAT COLLECTORS

[75] Inventor: Eduard Justi, Braunschweig, Germany

[73] Assignee: Metallgesellschaft Aktiengesellschaft, Frankfurt am Main, Germany

[21] Appl. No.: 678,729

[22] Filed: Apr. 21, 1976

[30] Foreign Application Priority Data

Apr. 23, 1975 Germany .............................. 2517898

[51] Int. Cl.² ................................................ F24J 3/02
[52] U.S. Cl. ..................................................... 126/271
[58] Field of Search ................ 126/270, 271; 237/1 A; 165/169, 170, 171, 172

[56] References Cited
U.S. PATENT DOCUMENTS 1,338,644  4/1920  Arthur ................................. 126/271
3,939,819  2/1976  Minardi ............................... 126/271

Primary Examiner—Kenneth W. Sprague
Assistant Examiner—James C. Yeung
Attorney, Agent, or Firm—Karl F. Ross

[57] ABSTRACT

A solar-heat collector comprises a sheetmetal shallow box open on one side and receiving an absorber provided with passages traversed by a heat-transfer fluid. The absorber is provided with means for feeding the fluid to the passage and withdrawing the fluid therefrom for use. The feeding conduit means is in heat-transfer contact with the sheetmetal of the box so that an indirect exchanging relationship between the box and the fluid, as a preliminary heat exchanger, is established. A covering of a translucent material closes the open side of the box above the absorber.

13 Claims, 4 Drawing Figures

LOW-LOSS SOLAR HEAT COLLECTORS

FIELD OF THE INVENTION

The present invention relates to improved solar collectors for converting incident solar radiation with the highest possible efficiency into useful heat for room heating or room cooling and for water heating; the feeding of thermal engines and electric generators is also contemplated.

BACKGROUND OF THE INVENTION

Such solar collectors are now being used in all continents, and their design has remained virtually the same since the first of these collectors were used in Florida decades ago and is diagrammatically shown in FIG. 1. The most essential component is a sheet-metal element, which is irradiated by the sun at an angle which should approximate a right angle as closely as possible and which on the side facing the sun has been blackened by any of various possible methods in such a manner that this side has a maximum absorption capacity for visible light and is heated as a result of such absorption.

This sheet-metal element 1 has a high thermal conductivity and conducts the sensible solar heat to metal tubes 2, which are joined to the sheet-metal element and are traversed by a heat-transfer liquid 3, which consists preferably of beneficiated water and subsequently delivers its heat content, possibly through heat exchangers, for purposes such as room heating, water heating, the operation of absorption refrigerators for household and room cooling, the temperature control of swimming pools and the storage of such heat in highly heat-insulated storage tanks.

A given solar radiation causes the absorber to assume a maximum temperature $T_a$, which reaches an equilibrium when the rate at which solar energy is absorbed equals the total rate at which heat is delivered by heat conduction, convection, radiation and by withdrawal of liquid.

To minimize the abovementioned dissipative effects, the absorber 1, 2 is usually enclosed in a box 4, which is provided with sufficiently thick heat-insulating interlayers 5 consisting of rock wool or porous plastics or ceramic materials and reduces the loss of heat from the absorber 1 and hot water tubes 2 to the environment.

The dissipation of heat from the side facing the sun cannot be decreased by such a simple expedient because the abovementioned heat insulators, which are opaque, cannot be used. On the side facing the sun, the box must be covered with one or more glass panes or sheets of plastic (synthetic-resin) material 6, which absorb infrared radiation to reduce the dissipation of heat by radiation. However, they reflect and absorb visible light and thus effect an attenuation in this part of the spectrum.

In accordance with the known Stefan-Boltzmann law, the heat radiation from the absorber equals $E = \sigma \times T_a^4$ and in accordance with Wien's displacement law has an energy maximum at a wavelength $\lambda_{ma} = 2900/T_a$ so that in a definite case, in which $T_a = 400°$ K, $\lambda_{max} = 7.2$ $\mu$m in the near-infrared range. A covering of the side facing the sun with glass panes or synthetic-resin material sheeting cannot result in a satisfactory insulation against a dissipation of heat by conduction and convection because such coverings are rather thin.

Whereas the absorption of solar radiation will be reduced if the radiation is caused to fall at an oblique angle on the absorber plane 1 in that the same is continually adjusted in dependence on the position of the sun, such an arrangement is complicated and expensive in practice. For this reason the planar absorbers are fixed with such an orientation that a maximum mean value of the absorption of radiation between sunrise and sunset is obtained in accordance with the known laws of trigonometry. Calculation shows that this requirement will be met if the absorber plate is inclined toward the south (on the northern hemisphere) at an angle which exceeds the geographical latitude by about 10°. For this purpose, a support 7 is provided.

It will be appreciated and can be quantitatively derived by calculation from the heat balance that the maximum temperature $T_a$ assumed by the solar collector and its maximum heat output are proportional to the ratio of solar power input to heat delivery rate. At an absorber temperature $T_a = 393°$ K ($= 120°$ C) the dissipation of heat by radiation having a constant $o = 5.73 \times 10^{-11}$ $(kW/m^2 \times T^4)$ will reach the ideal value 1.35 kW/m² of the solar constant and must not be neglected in view of the dissipation of heat by convection and conduction, which is proportional to the temperature difference $T_a - T_u$ ($T_u =$ absolute ambient temperature).

As a quantitative numerical example it is stated that a perfected thermal insulation of a Florida-type solar collector as shown in FIG. 1 provides for a measured mean field coefficient of heat transfer $\alpha = 2.2$ $kcal/m^2-h-$deg. so that a solar heat absorption of 750 $kcal/m^2-h$ and a heat-delivering surface area $F = 2.5$ $m^2$ result in a maximum temperature of $750/2.2 \times 2.5 = 130°$ C. When it is realized that in accordance with published data a heat insulation in a thickness up to 15 cm is required for such $\Delta T$, it will be appreciated that the efficiency cannot be increased further in this way although such increase would be desirable for technical and economic reasons.

OBJECT OF THE INVENTION

It is the principal object of the present invention to provide an improved solar-heat collector having greater efficiency than earlier solar-heat collectors and capable of being constructed at relatively low cost in large quantities.

SUMMARY OF THE INVENTION

In accordance with the invention the film heat transfer rate $F \times \alpha(T_a - T_u)$ is further reduced in that the solar collector is enclosed in a highly heat-conducting sheet metal box, which is open only on the side facing the sun and is supplied with cold water intended to receive solar heat and to maintain said box at a temperature $T_k$, which differs only slightly from the ambient temperature $T_u$ so that the heat-dissipative effects are proportional to the relatively small differences $(T_k - T_u)$ and $(T_a^4 - T_u^4)$, respectively. In accordance with the invention this is accomplished in that the metal shell, which resists an entropy change, is in heat transfer contact with the water supply conduit to form an isothermal surface at temperature $T_k$. Owing to the temperature drop $T_a - T_k$, the heat which has been dissipated from the hotter collector parts is utilized to preheat the inflowing water, which has entered at $T_u$.

BRIEF DESCRIPTION OF THE DRAWING

The above and other objects, features and advantages of the invention will become more readily apparent from the description below of two illustrative embodiments, reference being made to the accompanying drawing in which.

SPECIFIC DESCRIPTION

First Embodiment

Figure 1:
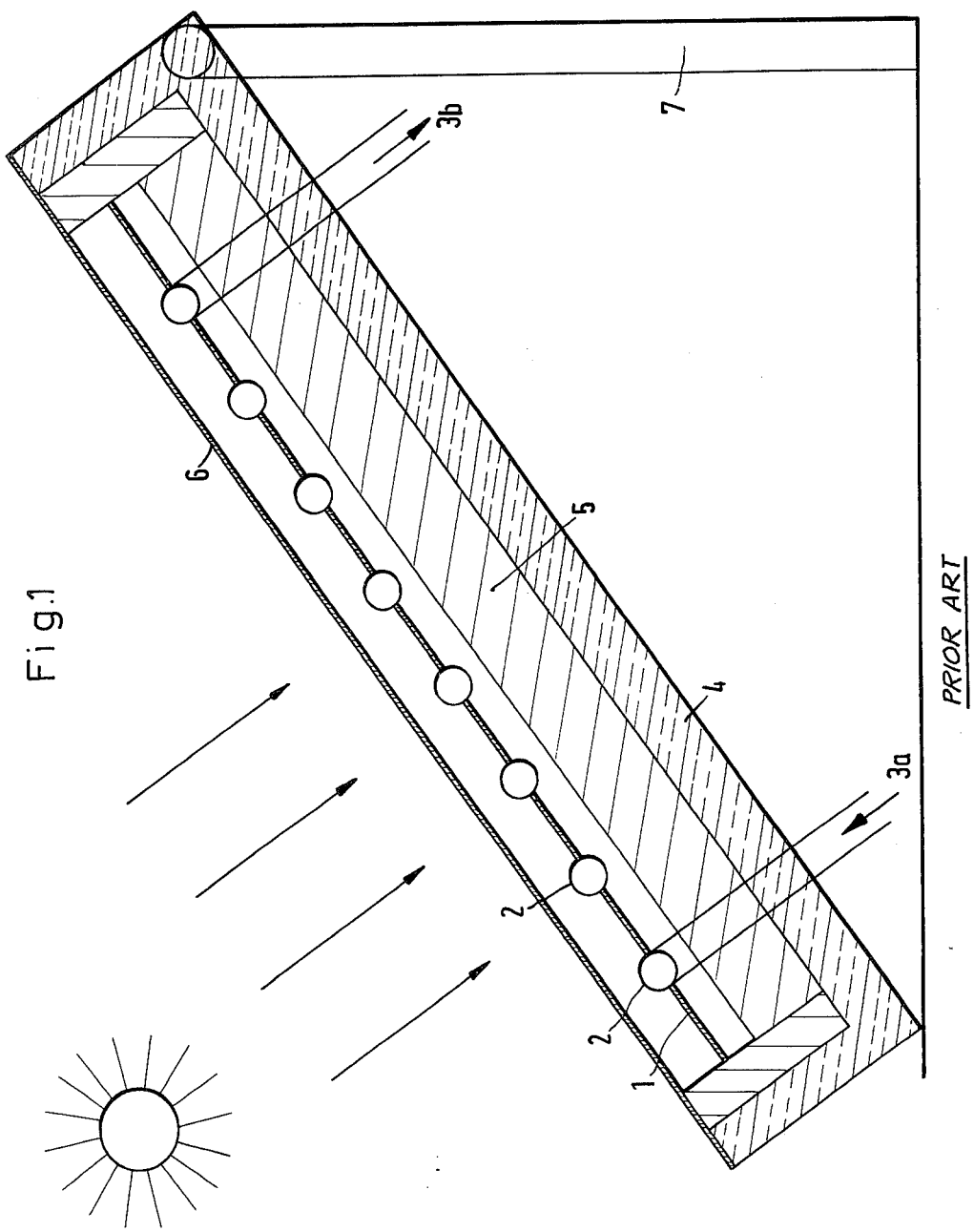
FIG. 1 is a diagrammatic cross sectional view of the so-called "Florida type" solar-energy collector constituting prior art and described above.

This embodiment is characterized by the use of components which are standardized in other industries, in this case in the heating industry, and are manufactured at low cost in large quantities and, unlike the structure shown in FIG. 1 can be assembled from standardized plate-type heaters of steel and standardized connector fittings whereas expensive parts which must be specially made are not required.

Figure 2:
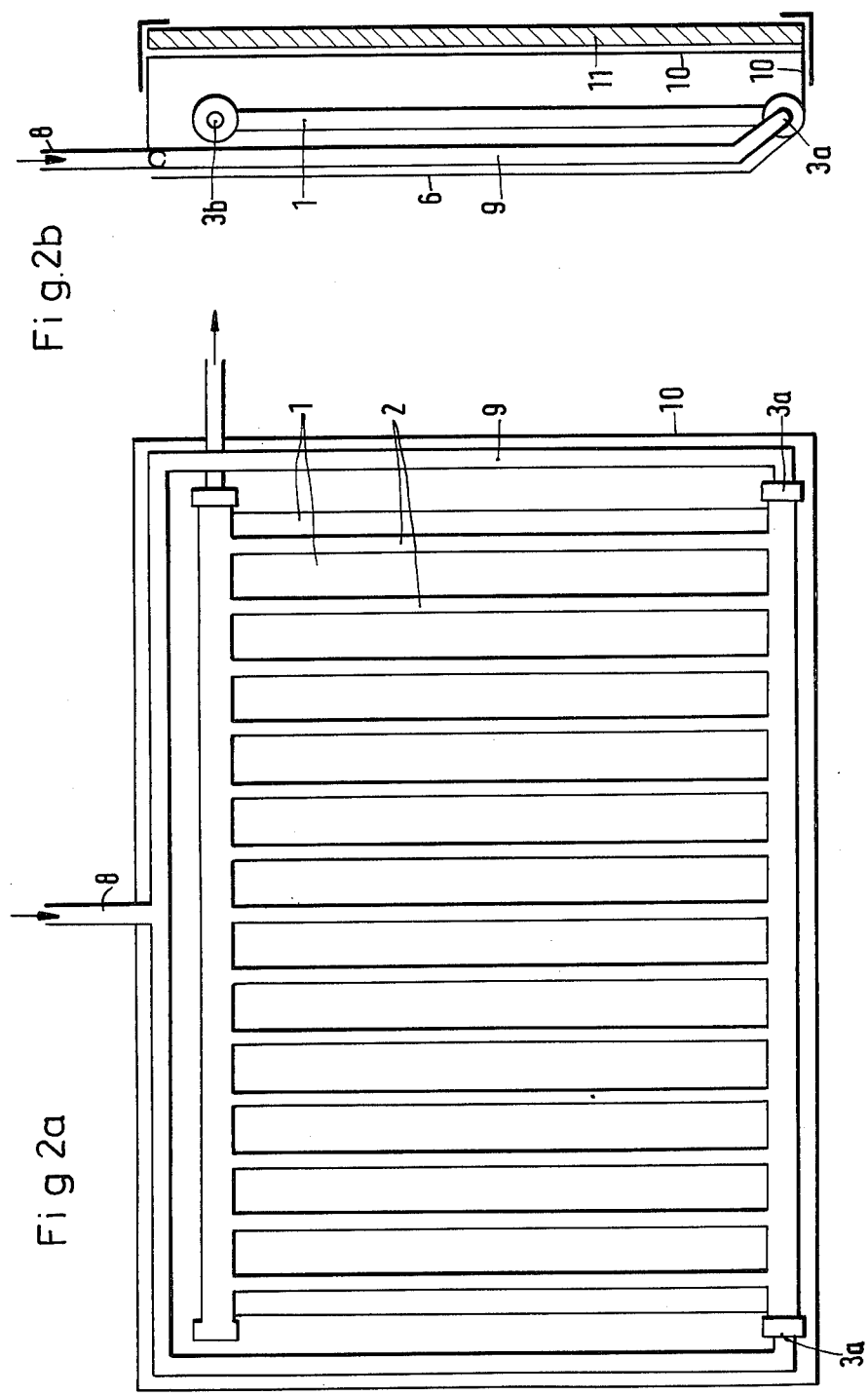
FIG. 2a is a diagrammatic plan view of the first embodiment of a solar-heat collector according to the invention.
FIG. 2b is a diagrammatic section through the solar-heat collector of the first embodiment.

The design is shown in end elevation in FIG. 2a and in side elevation in FIG. 2b, and the parts designated 1 to 7 are analogous to parts designated with the same reference numerals in the conventional Florida-type collector.

A plate-type heater 1 consists of two welded sheet steel elements, which have been embossed or beaded to provide a lower horizontal manifold provided with inlets 3a for distributing the inflowing cold water, an upper horizontal manifold provided with outlets 3b for collecting the heated or evaporated water, and vertical heating and evaporating tubes 2, which are disposed between the manifolds. Thirteen tubes 2 are shown on the drawing.

To ensure maximum absorption, that side of the heater which faces the sun (obverse) has been blackened by known processes. The shadow side (reverse) has been left bright or painted white to minimize its emissivity, which influences the dissipation of heat by radiation.

In accordance with the invention the cold water which enters at the temperature $T_k$ is not directly conducted into 3a but is supplied to a pipe 8, which is bifurcated by a tee fitting so that the cold water flows on the outside through pipe 9 along the hot water-collecting manifold 3b and around the vertical edges of the plate-type heater before entering the above-mentioned inlets 3a of the lower horizontal manifold for distributing the cold water.

From the side elevation shown in FIG. 2b it is apparent that the two vertical portions of the pipes 9 are somewhat offset near their lower ends so that the upper portions are spaced a few centimeters above the plate-type heater 1 and can support the covering 6 of glass or synthetic-resin or other plastic sheeting.

It is also apparent that a sheet metal box 10 which resists an entropy change is in heat transfer contact with the frame, which is maintained at $T_k$ and which consists at the top and on the sides of the pipes 9 and at the bottom of the cold water inlet manifold 3a. When the entering cold water is in the summer at a temperature $T_k$ which is lower than the ambient temperature $T_u$, this box need not be heat-insulated at all toward the outside.

For operation in the cold season, when $T_k > T_u$, the box may be provided with adhered thin insulating sheeting 11. This entropy-change-resisting sheet metal shield is not only less expensive than the conventional wooden frames provided with insulating layers in a thickness up to 15 cm but also eliminates a difficulty which in the previous practice has opposed the optimization of such collectors and a resulting increase of $T_a$ above 100° C; the low thermal conductivity (e.g., $k - 0.003$) of light-weight modern heat-insulating materials is due to the porous structure of such materials which have closed air-filled pores.

Under the prolonged action of elevated temperatures, these plastic materials, such as extruded polystyrene, begin to flow so that the pores are eliminated and the heat insulation is no longer adequate. This difficulty encountered in practice is eliminated in accordance with the invention in that the insulating plates 11 are held in contact with the cold water inlets 8 and 3a. This design permits actually of temperatures above 130° so that superheated steam for feeding thermal engines can be generated. Collectors of this type having vertical evaporator tubes are known to be particularly suitable for a separation of liquid water and water vapor.

Second Embodiment

Figure 3:
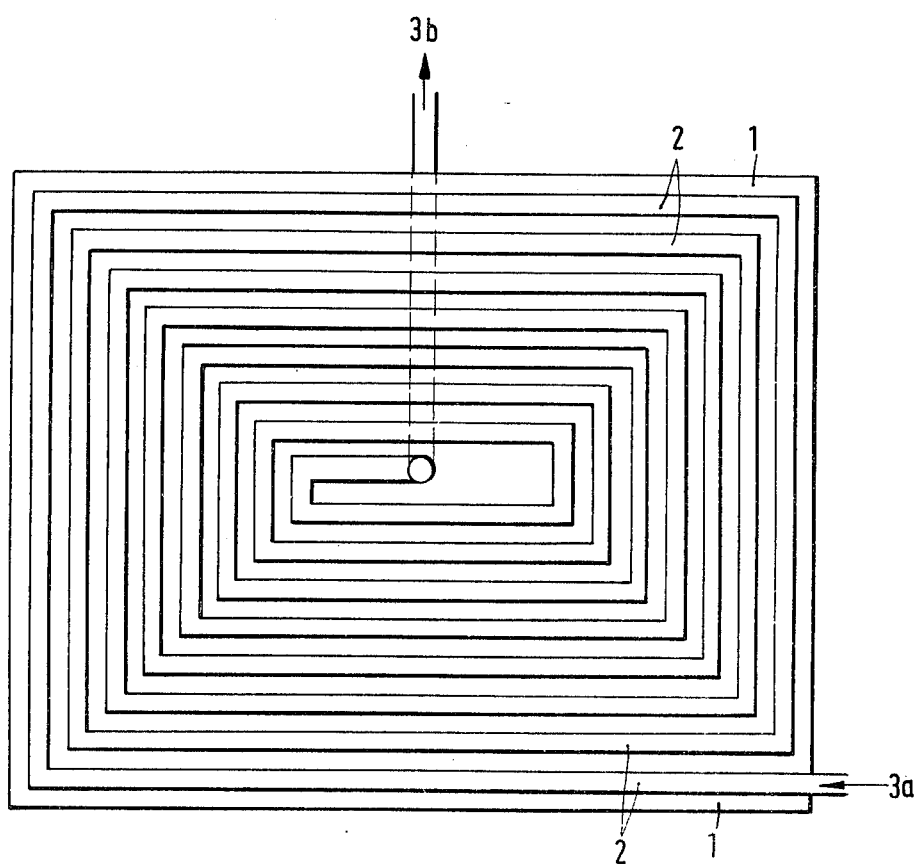
FIG. 3 is a diagram of an absorber passage arrangement which can be substituted for the solar-heat absorber of the first embodiment and illustrating the second embodiment of the invention.

When such high temperatures and a generation of steam for electric power production are not required and moderate temperatures and steam pressures are considered satisfactory for room heating, preparation of hot water, etc., it is not necessary to provide rows of vertical evaporator tubes 2 as shown in FIG. 2a but the evaporator tubes may be arranged in any geometrical pattern. An example of such an arrangement is shown in FIG. 3 in an embodiment of the invention which comprises a single spiral tube 2, which is formed in the absorber plate 1 in such a manner that the cold water first enters the outermost convolution of the spiral at 3a and the temperature of the water increases from each convolution to the next until the water at $T_a$ finally exists at the center in a direction which is at right angles to the absorber plate, which has been blackened on the side facing the sun and has a reflecting surface on the shadow side. Instead of a single spiral tube 2, a plurality of such tubes, which are connected in parallel, may be provided.

It is apparent that the inventive concept has been embodied in that the temperature $T_k$ of the inflowing cold water differs only slightly from the ambient temperature $T_u$ so that it is hardly subjected to an exchange of heat. The dissipation of heat from the hotter convolutions until $T_a$ is reached takes place approximately in a radial direction and the heat which is thus dissipated is recuperated by first convolution to preheat the cold water therein. This arrangement is simpler and less expensive but may be used only up to moderate temperatures.

When solar collectors according to the invention are assembled from commercially available components, particularly radiators such as are used in central heating systems, the selection must be governed by an essential rule, which is not obvious. The inventor has recognized that radiator-type collectors having a surface which deviates considerably from a plane, such as corrugated or finned structures, have a much lower efficiency than shapes which depart from a plane only as much as is required for the formation of water-heating passages. It will be particularly desirable to provide an absorber which is as flat as possible on one side, which is arranged to face the sun, whereas the water passages are defined by a non-planar wall, which is arranged on the shadow side. This may be explained in that the directed sunlight is absorbed only by those surface areas on which it is incident at right angles whereas heat is dissipated by radiation from the entire surface. For the purposes of the invention it will not be favorable if the surface area from which heat is dissipated by radiation exceeds the heat-absorbing surface area by more than 20%.

Whereas the foregoing specification and drawing relate only to planar solar collectors, the invention may be applied with advantage and sometimes with even greater advantage so solar collectors which comprise optical means, such as paraboloidic, linear-paraboloidic or conical sheet metal reflectors, for converging the solar radiation onto a blackened heat collector which is thus heated to correspondingly higher temperatures $T_a$. Without further explanation it is apparent that in such case the heat transfer liquid to be heated, particularly water, will also be supplied to the heat collector in the manner which is diagrammatically shown in FIG. 2 or particularly in FIG. 3 so that the dissipated heat, which would result in even larger heat losses due to the higher temperature drip $T_a - T_u$, is recuperated and utilized for preheating the water.

Within the scope of the invention the cold water supply conduit 8, 9 may be omitted and the cold water may be directly supplied to 3a. In this case the box- or tub-shaped recuperator shield is in heat transfer contact only with the lower horizontal inlet manifold for the cold water.

I claim:

1. A solar-heat collector for converting solar radiation into usable heat by warming a heat-transfer fluid, said solar-heat collector comprising:
    a heat-confining enclosure in the form of a thermally conductive sheet-metal case open on one side and having an edge region surrounding said opening and a rear wall;
    a flat heat conductive absorber formed with passages traversed by said fluid and disposed in said case parallel to the open side thereof and to the rear wall thereof, said passages being spaced from said case;
    first conduit means communicating with said passages and delivering said fluid in a relatively cold state to said passages of said absorber, said first conduit means being disposed in heat conducting relationship with said edge region of said case for maintaining same at a temperature level corresponding to that of said cold fluid;
    second conduit means for leading warm fluid from said passages;
    a translucent covering for said open side of said case overlying said absorber; and
    a layer of thermal insulation lying along said rear wall, said first conduit means extending along a plurality of the lateral edges of the absorber and being in contact with said case along said edges.

2. The solar-heat collector defined in claim 1 wherein said absorber has a flat forward face turned toward said covering and a shaped rear face defining said passages for said fluid.

3. The solar-heat collector defined in claim 2 wherein said passages extend from bottom to top and are provided at their lower ends with a common inlet communicating with said first conduit means and their upper ends with a common outlet communicating with said second conduit means.

4. The solar-heat collector defined in claim 2 wherein said passages extend in at least one spiral configuration having an inlet at an outermost convolution communicating with said first conduit means and an outlet at an innermost convolution communicating with said second conduit means.

5. The solar-heat collector defined in claim 1, further comprising means for mounting said covering on said first conduit means.

6. The solar-heat collector defined in claim 5 wherein said covering comprises at least one glass pane.

7. The solar-heat collector defined in claim 5 wherein said covering comprises at least one synthetic-resin plate.

8. The solar-heat collector defined in claim 5 wherein said covering comprises at least one synthetic-resin sheet.

9. The solar-heat collector defined in claim 1 wherein said absorber has a flat blackened face turned toward said covering and a heat-reflective face turned away therefrom.

10. The solar-heat collector defined in claim 1 wherein said absorber has a face turned away from said covering with a surface area exceeding by up to 20% the surface area of the face of the absorber turned toward said covering.

11. The solar-heat collector defined in claim 1 wherein said absorber has a cold side and a warm side, said cold side being in contact with the sheetmetal of said case.

12. The solar-heat collector defined in claim 11 wherein said case supports the other parts of the solar-heat collector.

13. The solar-heat collector defined in claim 1 wherein said layer of thermal insulation is an insulating synthetic-resin material disposed along the exterior of said case.

* * * * *